Figure 1:
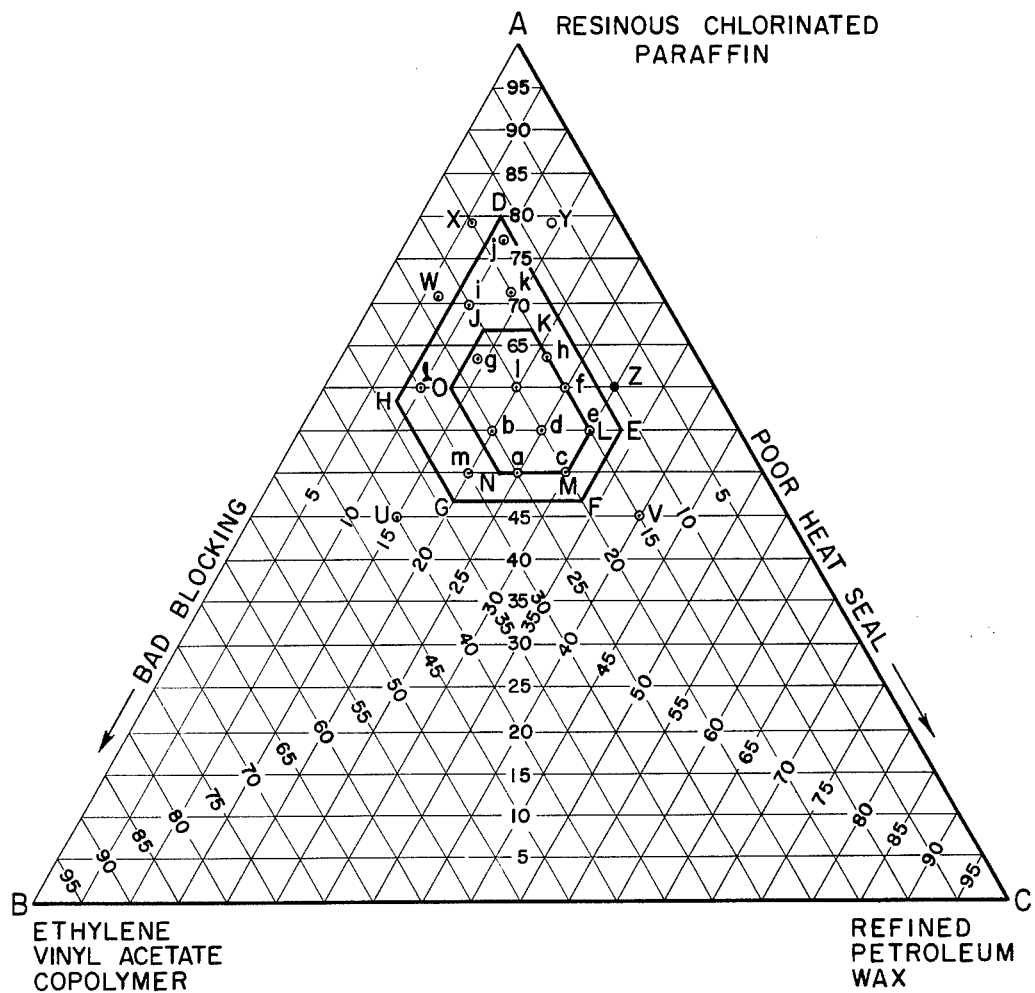

United States Patent Office 3,223,662
Patented Dec. 14, 1965

3,223,662
REFINED PETROLEUM WAX-ETHYLENE VINYL ACETATE COPOLYMER-CHLORINATED PETROLEUM WAX COMPOSITION
Albert William Dreger, Blackwood, N.J., assignor to E. I. du Pont de Nemours and Company, Wilmington, Del., a corporation of Delaware
Filed Sept. 29, 1961, Ser. No. 141,813
15 Claims. (Cl. 260—28.5)

This invention relates to coating compositions and more particularly to coating compositions having as the essential organic film-forming components thereof a combination of resinous chlorinated paraffin, a copolymer of ethylene and vinyl acetate, and a petroleum wax, and to pellicles coated therewith characterized by heat-sealing properties and by resistance to transmission of water vapor.

The coating art is profuse with formulations designed to provide the packaging industry with coated pellicles, e.g., paper, glassine and cellophane, having desirable heat-sealing properties and low permeability to moisture vapor. Nitro-cellulose lacquer formulations having as the essential organic film-forming materials thereof nitrocellulose and compatible resins and plasticizers, and containing a small effective proportion of moistureproofing petroleum wax have been found to be particularly useful for coating these pellicles.

Nitrocellulose formulations require high cost and quality solvents or solvent-diluent combinations is providing the packaging industry with a coated pellicle characterized by low odor suitable for food packaging. Such solvents and solvent combinations are more costly than the volatile contents of similar lacquers not subject to the low odor requirement and to compensate for this cost, users of large quantities of these nitrocellulose lacquers provide their coating equipment with a solvent recovery system for reuse of the solvents.

I have now invented a non-nitrocellulose coating formulation which obviates the use of the costly nitrocellulose lacquer solvents and which applied at coating weights ordinarily used with the nitrocellulose formulations provides improved resistance to transmission of moisture vapor. Such improvement permits the use of significantly lower coating weights in at least equaling the moisture vapor permeability of nitrocellulose lacquer formulations extensively used for that purpose.

Coating compositions of this invention have as the essential organic film-forming material thereof a ternary combination of (A) a resinous chlorinated paraffin having a chlorine content of at least 60% by weight, preferably 65% to about 70% chlorine, as the principal component, (B) an effective heat-sealing proportion of a copolymer of ethylene and vinyl acetate containing 20% to 40% of copolymerized units from vinyl acetate, and (C) an effective moistureproofing proportion of at least one refined petroleum wax.

The drawing, FIGURE 1, constituting a triangular coordinate graph defines useful and preferred proportions of the essential components of the ternary combination. Coordinates within the area D, E, F, G, H define useful proportions for practicing this invention and coordinates within the area J, K, L, M, N, O define preferred proportions useful in practicing this invention. Useful proportions of (A) the resinous chlorinated paraffin range from 47 to 80 parts, the preferred proportions being from 50 to 67 parts. Useful proportions of (B) the ethylene/vinyl acetate copolymer range from 12 to 33 parts, the preferred proportions being from 15 to 27 parts. Useful proportions of (C) the refined petroleum wax range from 8 to 33 parts, the preferred proportions being from 13 to 30 parts. The indicated parts are based on 100 parts by weight of (A) plus (B) plus (C). Preferably the relative proportion of (C) is in the range of 40 to 60 parts per 100 parts of (B) plus (C).

When the ternary combination contains a proportion of (B) ethylene/vinyl acetate copolymer significantly in excess of 33 parts as defined by line G H, of the useful area, blocking of the coated pellicle is rated as bad. When the proportion of petroleum wax (C) is significantly in excess of that defined by line E F of the useful area, the heat-sealing properties of the coated pellicle are rated as poor. At least 12 parts of (B), as indicated by line D E, is necessary to provide an adequately effective contribution of the copolymer toward heat-sealing. At least 8 parts of (C), as indicated by line D H, is necessary to provide an adequately effective contribution of the refined wax toward moistureproofing and resistance to blocking. Thus, when the proportion of (A) resinous chlorinated paraffin is greater than 80 parts, the resulting ternary combination is deficient in these indicated desirable characteristics.

Resinous chlorinated paraffin is commercially available as "Chlorowax" 70 having a chlorine content of about 70%. The molecular weight of this grade of chlorinated paraffin is of the order of magnitude of about 1060. Completely chlorinated paraffin ordinarily does not exceed about 72% chlorine content. "Chlorowax" 70 is characterized by a melting point of about 100° C. by the Ball and Ring method, a specific gravity of about 1.65, and a refractive index of 1.535 at 25° C.

Liquid species of chlorinated paraffin, e.g., "Chlorowax" 50, having a chlorine content of about 50% and a molecular weight of about 660 and "Chlorowax" 40 having a chlorine content of about 40% and a molecular weight of about 560, can be blended with the resinous species in limited proportions, these liquid species preferably constituting not more than 25% by weight of the chlorinated paraffin mixture. The chlorine content of the chlorinated paraffin is preferably at least 65%, but some useful mixtures may have a chlorine content as low as 60% by weight.

Useful copolymers of ethylene and vinyl acetate, designated herein for convenience as E/VA copolymers, have a content of 20% to 40% of copolymerized vinyl acetate. Preferred copolymers have a content of copolymerized vinyl acetate being in the range of about 27% to 33%. These useful copolymers are further characterized by an inherent viscosity in the range of 0.5 to 1.50, based on solution of 0.25% of the copolymer in toluol at 30° C., species having an inherent viscosity of 0.6 to 1.2 being preferred. Species of E/VA copolymer having these preferred composition and viscosity characteristics are commercially available as "Elvax" 150 and "Elvax" 250 which are additionally characterized by molecular weights of about 300,000 and 400,000 respectively, and ASTM Test No. D-1238-52T melt index of 25 grams and 15 grams respectively at a temperature of 190° F. under a piston load of 2,160 grams, the measuring period being 10 minutes.

Copolymers of ethylene and vinyl acetate can be prepared by methods well known in the art, e.g., by the methods described in U.S. Patents 2,200,429 and 2,703,-794. Useful copolymers are not limited to two component copolymers of copolymerized ethylene and copolymerized vinyl acetate in the indicated proportion. Useful E/VA copolymers may further contain copolymerized units from copolymerizable monomers which provide the poly-component copolymer or interpolymer with effective small proportions of a functional group, e.g., carboxyl, amido, amino, hydroxyl, or epoxy. Such functional groups may be supplied by acrylic acid, methacrylic acid, itaconic acid, acrylamide, β-dimethylaminoethyl methacrylate, β-hydroxyethyl acrylate, glycidyl methacrylate or glycidyl acrylate. Unites from these functional monomers may be present in proportions up to 3% by weight of the useful E/VA copolymers as defined.

Useful petroleum waxes are the paraffin hydrocarbon grades which are commercially available in grades ranging from the white scale wax having an ASTM–D–87 melting point of 121° to 123° F. to the fully refined grades of various melting point ranges which ordinarily may be as high as about 200° F. The commercially available waxes are sometimes reported with its (AMP) American Melting Point which is equal to the ASTM melting point plus 3° F. Preferred species of refined paraffinic petroleum waxes have an AMP melting point in the range of from about 130° F. to about 165° F. While useful petroleum waxes may have an ASTM–D–721–51T oil content ranging up to about 4.5%, the preferred refined waxes are characterized by a low oil content, i.e., ordinarily less than 0.5%. The presence of a significant oil content in the wax contribute to lower blocking temperatures and lower staining temperatures. Typical useful commercially available refined paraffinic petroleum waxes are:

Aristowax 130/134
Aristowax 132/136
Aristowax 138/140
Aristowax 140/147
Aristowax 143/150
Aristowax 160/165
Bee Square Wax 190/195
Sunoco Wax #985
Sunoco Wax 3425, AMP 130° F.
Sunoco Wax 3420, AMP 136° F.
Sunoco Wax 4415, AMP 145° F.
Sunoco Wax 5512, AMP 154° F.

Although single grades of the petroleum wax may be used as the moistureproofing wax component of the coating formulations of this invention, the wax component (C) preferably consists of two or more grades of wax to provide a desirable balance of properties. For example, a moderately high melting wax, e.g., Aristowax 140/147, is used as the principal moistureproofing wax in combination with a lower melting wax, e.g., Sunoco Wax 3420 or 3425, which provides slip to the resulting coated pellicle.

The three essential components of the composition can be melt-blended or they can be blended in solution in a liquid medium comprising at least one mutual solvent for the components. The resinous chlorinated paraffin, the principal component, is readily soluble in aromatic hydrocarbons, aliphatic hydrocarbons, high solvency petroleum naphthas, hydrogenated naphthas, mineral spirits, chlorinated hydrocarbons, ketones and esters, but is insoluble in alcohols, glycols and glycerol. The E/VA copolymers, as defined, are soluble in aromatic hydrocarbons and high solvency petroleum naphthas and only sparingly soluble in ketones and esters. The petroleum waxes are soluble in hydrocarbon solvents. Although a wide selection of solvents is available for dissolving the resinous chlorinated paraffin, the liquid medium which is a mutual solvent for all three components ordinarily is composed primarily of hydrocarbon solvent, preferably an aromatic hydrocarbon solvent, e.g., toluol, xylol or high solvency petroleum naphthas having a high aromatic content and preferably distilling in the range of 150° F. to about 300° F. Toluol and high solvency petroleum naphthas designated as toluol substitutes are especially preferred as the mutual solvent.

Fluid solution coating compositions having a non-volatile content as high as 60% of the three essential components can be prepared and useful compositions may have a non-volatile content of 10% or even lower. The solution coating compositions are prepared preferably with non-volatile content in the range of 15% to about 45% by weight. One of the advantages of the invention compositions is low solution viscosity at relatively high non-volatile content which permits the coating to be applied at relatively high non-volatile content with significant reduction in solvent cost.

A solvent-free hot-melt of the three essential components is characterized by a low melt viscosity which permits the combination to be applied satisfactorily as a hot-melt coating. The composition as a hot-melt preferably further includes a suitable stabilizer for the chlorinated component to enhance the melt stability and pot life of the composition. While a host of well known stabilizers for chlorine-containing compounds may be used, stabilizers having epoxy functionality, i.e., an oxirane group having the oxygen atom bridging adjacent carbon atoms, are preferred for stabilizing the invention composition. Ordinarily the proportion of the acid-accepting stabilizer is in the range of 0.3 to 5 parts per 100 parts of the essential ternary combination of film-forming material. Typical useful epoxy stabilizers include "Epon" 828 epoxy condensate of bis-phenol A and epichlorohydrin having an epoxy equivalent weight in the range of 175 to 210, and "Paraplex" G–60 having an oxirane oxygen content of about 6.1%, "Paraplex" G–62 having an oxirane oxygen content of about 6.5% and "Epoxol" 9–5 having an oxirane oxygen content of about 9%, the latter three being epoxidized oils. The solution type coating composition ordinarily does not require the presence of an acid-accepting stabilizer inasmuch as processing and application are not at temperatures which induce significant degradation by heat. However, if desired the stabilizer may be included in the solution composition.

In addition to the three described essential organic film-forming components in the indicated proportions, the compositions may further contain effective modifying small proportions of other organic film-forming materials compatible therewith. Numerous resins, polymers and plasticizers are compatible with the resinous chlorinated paraffin and consequently compatibility of these materials with E/VA polymer and the refined petroleum wax in the presence of the major proportions of the resinous chlorinated paraffin is the determining factor as to incorporating such modifiers. Ordinarily such modification is not necessary inasmuch as variation within the indicated proportions of the three essential components provides extensive variation in properties of the coating.

Ordinarily the compositions are unpigmented, but pigments and extenders may be included in the formulation. Slip agents and anti-blocking agents often found in paper coating compositions may be included in their ordinary effective small proportions. These agents ordinarily are not required in the invention formulations because these properties generally are achieved by appropriate selection of the species of respective components and variations in proportions.

In preparing the compositions, the three essential components are blended together either in the presence of a liquid medium comprising a mutual solvent or as a molten mixture. In the solution type compositions, the respective essential components may be initially dissolved in a solvent as individual preformed solutions which are then blended together or the resinous chlorinated paraffin may be initially dissolved to form a solution and the remaining components blended into the solution. The order of addition is not critical. Because of the more limited solubility of the petroleum wax and the E/VA copolymer, these components are blended into the composition, preferably at an elevated temperature, i.e., in the range of about 90° F. to about 135° F. Higher temperatures up to the boiling temperature of the solvent may be used, but heating above 135° F. ordinarily is not required in achieving rapid solution of the components. At temperatures below about 95° F., the liquid compositions become thixotropic and they ordinarily form gels at room temperature of about 77° F. These gel compositions are readily restored to the fluid state on heating to a temperature of at least 95° F.

In preparing the molten compositions, the refined petroleum wax component (C) is preferably initially melted, then the resinous chlorinated paraffin is added to the molten wax as the temperature is increased to above the melting point of the resinous chlorinated paraffin, and finally the E/VA copolymer is blended into the flux of the petroleum wax and the chlorinated paraffin. When a stabilizer is included, it is ordinarily blended into the composition prior to addition of the chlorinated component or added concurrently therewith. The stabilizer may be added to the final composition inasmuch as no significant degradation ordinarily occurs during the short time required for melt blending. Temperatures used in melt processing ordinarily do not exceed about 280° F. At higher temperatures, it is preferred to melt the resinous chlorinated paraffin in the presence of the stabilizer.

Any coating techniques, e.g., roller coating, spraying, brushing, extrusion and hot-melt application, ordinarily used in coating paper, glassine, cellophane and the like can be used to apply the coating compositions of this invention. Preferably, application is by roller coating, using a pair of metal metering rolls, from a coating bath in which the composition in liquid form is maintained at a suitable elevated temperature to provide uniformity in the coating bath, i.e., above 95° F. for the solution composition. Hot-melt compositions are maintained at melt temperatures which provide the desired melt viscosity for uniform application of the molten compositions.

The coatings can be applied effectively at coating weights ranging from about 1.5 pounds to 20 pounds, preferably 2 to 10 pounds per ream of 3000 square feet distributed on the two sides, i.e., 500 sheets, 24 inches by 36 inches each coated on two sides. The pellicle may be coated on one side with coating weights ranging from 0.75 pound to 10 pounds per ream. The drying rate of the coating applied at ordinary coating weights is rapid and exposure for 10 to 30 seconds to a drying temperature in the range of 200° F. to 275° F. ordinarily is adequate for drying the coating.

The coating compositions of this invention are particularly useful in providing packaging papers, pouch papers and glassine with a moistureproofing and heat-sealing coating. The Dictionary of Paper, American Paper and Pulp Association. New York, N.Y., 1940, defines glassine as a smooth, dense, transparent or semi-transparent paper manufactured primarily from chemical wood pulps which have been beaten to secure a high degree of hydration of the stock, the paper ordinarily having a weight of 15 to 40 pounds per 3000 square feet, some special grades ranging to 90 pounds. Pouch paper is a grade of glassine characterized as being less dense and as having unit weight ordinarily higher than the average unit weight of glassine paper. Pouch paper thus ordinarily is thicker and more porous than glassine, and requires a relatively greater coating weight to equal the resistance to moisture vapor transmission characterizing the coated glassine. In addition to paper, glassine and cellophane, the coating composition can be applied usefully to other films and foils used as packaging materials, e.g., polyethylene film, polyporpylene film, polyethylene terephthalate film, polyvinyl fluoride film, and aluminum foil.

The examples which follow are intended to illustrated but not to limit this invention. All parts and percentages are given on a weight basis unless otherwise indicated.

EXAMPLE 1

| | Parts by weight |
|---|---|
| (A) Resinous chlorinated paraffin | 100 |
| (B) E/VA copolymer "Elvax" 150 | 33.3 |
| (C) Refined paraffinic hydrocarbon wax: | |
| (Petroleum wax 1, Aristowax #147 | 30.6 |
| (Petroleum wax 2, Sunoco Wax 3420 | 2.7 |
| Toluol | 278.4 |
| | 445.0 |

The resinous chlorinated paraffin is "Chlorowax" 70 having a chlorine content of about 70% by weight and a melting point of about 212° F. This resin at 70% concentration in toluol is characterized by a viscosity in the range of 44 to 54 seconds at 77° F. using a Du Pont 10 cup for viscosity measurement at 77° F.

The E/VA copolymer "Elvax" 150 is an interpolymer of ethylene and vinyl acetate which in 100 parts contains about 30 parts of copolymerized vinyl acetate and about 70 parts of polymerized ethylene. This interpolymer at 10% concentration is characterized by a viscosity in the range of 35 to 40 seconds at 85° F. using a Du Pont 7 cup for viscosity measurement. The interpolymer is further characterized by an inherent viscosity of about 0.77 based on a concentration of 0.25% in toluol at 85° F. The E/VA copolymer enhances heat-sealing properties of the composition.

Refined petroleum wax 1, the primary function of which is to provide moistureproofing, is a refined paraffinic hydrocarbon petroleum wax characterized by a melting point in the range of 140° to 147° F.

Refined petroleum wax 2, the primary function of which is to provide slip to the deposited coating, is a refined paraffinic hydrocarbon wax of petroleum origin having a melting point in the range of 132° to 136° F.

The toluol is the redistilled grade commercially available as 1° nitration grade toluol.

The essential film-forming components are in the proportion of 60 parts of (A), 20 parts of (B), and 20 parts of (C). Coordinates for this composition are designated as 1 on the triangular coordinate graph.

The ingredients are mixed in a steam-jacketed or water-jacketed mixer which permits the contents to be heated to 100° F. or higher. In mixing, the toluol may be heated initially to a temperature in the range of 100° to 135° F. and the resins and waxes added thereto with the temperature not dropping significantly below 100° F. during mixing. The resulting liquid composition having a solids content of about 37.5% is characterized by a viscosity in the range of 35 to 70 centipoises at 100° F. using a Brookfield viscosimeter with a #1 spindle at 20 r.p.m. The composition increases in viscosity significantly at temperatures below 85° F. and is a thixotropic gel at room temperature of about 77° F. For application, this composition is thinned to 21% non-volatile content with toluol.

*Comparative heat-sealing, moistureproofing lacquer composition*

A nitrocellulose lacquer composition is prepared having the following formulation:

| | Parts by weight |
|---|---|
| Nitrocellulose, 30% alcoholic volatile content | 21.4 |
| Ethyl acetate | 41.8 |
| Resin mixture | 8.2 |
| Phthalate plasticizer mixture | 14.2 |
| Toluol | 14.4 |
| | 100.0 |

The nitrocellulose is regular lacquer grade having a nitrogen content in the range of 11.8% to 12.2% in the proportions of about 85 parts ½ second viscosity grade and about 15 parts of 5–6 second viscosity grade per 100 parts thereof. The resin mixture in 100 parts thereof consists of about 50 parts of rosin modified alkyd resin "Neolyn" 23, about 25 parts of ester gum, and about 25 parts of arylsulfonamide-formaldehyde resin "Santolite" MHP. The plasticizer mixture in 100 parts thereof consists of about 70 parts of dicyclohexyl phthalate and about 30 parts of dibutyl phthalate.

This composition has a non-volatile content of about 37.4%. For application as a moistureproofing paper lacquer, 100 parts of this comparative composition are blended at about 100° F. with 1.5 parts of refined petroleum wax, i.e., Aristowax #147, and 0.4 part of a pebble-ground dispersion of 25 parts carnauba wax in 75 parts of SD–23A denatured ethyl alcohol, and then thinned to a coating concentration of about 21% with a thinner which in 100 parts thereof is composed of about 25 parts of toluol and 75 parts of ethyl acetate. The carnauba wax is present as a slip agent.

The thinned composition of Example 1 and the thinned comparative lacquer composition are roller-coated by 5-inch width laboratory size machine on Rhinelander glassine paper (Roll 103) having unit weight of about 22 pounds, the respective coating baths being maintained at about 105° F. The coated glassine is dried for about 30 seconds at 200° F. The coating weight for the Example 1 composition is about 2.4 pounds per 3000 square feet coated on both sides. The coating weight for the comparative composition is 3 pounds in the indicated basis.

The appearance of the respective coated pellicles is equal, the coatings being glossy and free of mottling. With heat sealing at 10 pounds per square inch applied for ½ second dwell, the following results are obtained with the Example 1 coating.

Sealing Temperature: Grams pull
180° F. _____ 285
210° F. _____ 445
225° F. _____ 578
270° F. _____ 602

The comparative lacquer does not seal at 180° F. and 210° F. For 225° F. sealing temperature, the seal strength is 26 grams pull; at 240° F. sealing temperature the pull is 169 grams; and at 270° F. sealing temperature the pull is 325 grams. The pull to separate the seal is measured with a Suter Tester on strips of the coated glassine at one inch width at 50% relative humidity and 77° F. The Example 1 coating exhibits slight blocking under a load of 0.3 pound per square inch applied for 18 hours at 120° F. in comparison with a rating of considerable blocking for the comparative lacquer.

The moisture vapor transmission is measured, using the technique described in ASTM–D–988–48T Method B. This transmission is expressed as the grams of water vapor transmitted per 100 square inches per 24 hours. The glassine coated with the Example 1 composition exhibits an initial transmission value of 0.347 at 18 hours after coating, and a value of 0.243 at 72 hours after the initial determination. The comparative lacquer exhibits moisture vapor transmission of 2.002 at 18 hours and 1.774 at 72 hours later.

In a field test conducted on a semi-works coating unit capable of handling a 16-inch wide paper web, the Example 1 composition is coated on both sides of 30-pound glassine and of 30-pound pouch paper. The coated paper is dried by passage through a 15-foot horizontal drying oven maintained at 220° to 230° F. The pouch paper is coating at a speed of 30 feet per minute at several coating weights ranging from 2 to about 8 pounds per 3000 square feet, coated on both sides. The composition is coated at full strength of 37.4% non-volatile content to provide high coating weights and is reduced appropriately with toluol to provide lower coating weights. At 30% non-volatile content, a coating weight of 4.5 pounds per ream is achieved. The glassine paper is coated at a speed of 60 feet per minute with a total coating weight of 3 pounds per ream of 3000 square feet. The comparative composition is similarly coated on the pouch paper and the glassine paper at coating weights ranging from 3 to 3.5 pounds per ream at a coating speed of 30 feet per minute.

The appearance of the pouch paper and glassine finished with the Example 1 composition is rated excellent, the clarity being equal to the comparative lacquer and the gloss being superior to the comparative lacquer. Heat-sealing tests confirm the superior heat-sealing properties of the Example 1 coating over those of the comparative lacquer. The Example 1 coating yields a tearing seal when sealed at 250° F. under a pressure of 60 pounds per square inch with ½ second dwell. At 8-pound coating weight, excellent heat seals are obtained even with coated-to-uncoated paper. Excellent heat seals are also obtained with coated-to-coated pouch paper at coating weights as low as 2 pounds per ream.

Moisture-vapor transmission tests reveal the superiority of the Example 1 composition over the comparative lacquer in reference to resistance to transmission of water vapor through the coated glassine and the coated pouch paper, e.g., transmission for the coated glassine is 0.34 with the Example 1 coating versus 1.30 grams for the comparative nitro-cellulose lacquer on glassine.

EXAMPLE 2

A series of coating compositions are prepared using the same ingredients as specified in Example 1 with variations in proportions, sufficient toluol being added to provide the final coating compositions with a non-volatile content of 22% by weight. The relative proportions of the three essential components making up this non-volatile content on the basis of 100 parts are as follows:

|  | a | b | c | d | e | f | g | h |
|---|---|---|---|---|---|---|---|---|
| (A) "Chlorowax" 70 | 50 | 55 | 50 | 55 | 55 | 60 | 63 | 63 |
| (B) "Elvax" 150 | 25 | 25 | 20 | 20 | 15 | 15 | 23 | 15 |
| (C) Refined petroleum: |  |  |  |  |  |  |  |  |
| Wax 1 | 23 | 18 | 28 | 23 | 28 | 23 | 12 | 20 |
| Wax 2 | 2 | 2 | 2 | 2 | 2 | 2 | 2 | 2 |
| Total wax | 25 | 20 | 30 | 25 | 30 | 25 | 14 | 22 |

These respective compositions are roller-coated as described in Example 1 on both sides of 22-pound glassine and on both sides of 25-pound Rhinelander SC pouch paper (Roll 100) at a coating weight of about 3 pounds per ream and dried for 30 seconds at 200° F. Glassine and pouch paper are similarly coated with the comparative lacquer composition.

All of these Example 2 coatings on glassine exhibit greater resistance to transmission of water vapor than that of the comparative lacquer coating rated at 1.196, the range for the Example 2 compositions being from 0.517 to 0.926. In the heat-sealing test, using 10 pounds per square inch with ½ second dwell, the following ranges in grams pull are observed for the respective sealing temperatures:

180° F. _____grams__ 11 to 517
210° F. _____do____ 79 to 556
240° F. _____do____ 198 to 536
270° F. _____do____ 214 to 585

The comparative lacquer exhibits no seal strength at 180° F. and 210° F. sealing temperatures. With 240° F. sealing temperature, the grams pull is 169 and with 270° F. sealing temperature the comparative lacquer exhibits 325 grams pull.

These same advantages over the comparative lacquer are indicated by results obtained with the coated pouch paper. In this series of tests with pouch paper, the 2g and 2h coating compositions exhibit water vapor transmission of the same order of magnitude as the comparative lacquer, i.e., about 11 grams. However, these members of the series, like the remaining members, exhibit significantly better heat seal on pouch paper in comparison with the pouch paper coated with the comparative nitrocellulose lacquer which exhibits 97 grams pull and 171 grams pull when sealing is at 225° F. and 250° F. respectively, using 10 pounds per square inch with ½ second dwell. Under these sealing conditions, the heat seal for the Example 2g composition is 475 and 480 grams pull respectively, and the heat seal for the Example 2h composition is 285 and 323 grams pull respectively.

Coordinates for all these Example 2 compositions fall within the preferred operating area defined by J, K, L, M, N, O of the triangular graph and are designated by lower case letters "a" through "h".

EXAMPLE 3

Another series of coating composition are prepared with the same ingredients as specified in Example 1 except at proportions different from those indicated in Examples 1 and 2. These compositions are prepared for coating at 21% nonvolatile content, using a mixture of about 90 parts toluol and 10 parts of a special petroleum aliphatic fraction having an evaporation rate comparable with that of benzine. The distillation range of this fraction is from 150° to 235° F. The non-volatile content in 100 parts thereof consists of the following:

|  | i | j | k | l | m |
|---|---|---|---|---|---|
| (A) "Chlorowax" 70 | 70 | 77 | 71 | 60 | 50 |
| (B) "Elvax" 150 | 20 | 13 | 15 | 30 | 30 |
| (C) Refined petroleum: | | | | | |
| Wax 1 | 8 | 8 | 12 | 8 | 18 |
| Wax 2 | 2 | 2 | 2 | 2 | 2 |
| Total wax | 10 | 10 | 14 | 10 | 20 |

These compositions are coated on 22-pound glassine at coating weights ranging from 2.2 to 3.5 pounds per 3000 square feet coated on both sides and dried for 30 seconds at 200° F. All of these compositions provide acceptable coatings. These coatings provide high seal strength in the range of about 285 to 645 grams pull at sealing temperatures ranging from 180° F. to 270° F. under 10 pounds per square inch pressure with ½ second dwell. Glassine coated with the comparative nitrocellulose lacquer does not seal at temperatures significantly below 225° F., the pull being 26 grams and 325 grams respectively with sealing temperatures of 225° F. and 270° F. The coatings having a content of 10 parts of petroleum wax per 100 parts of the three essential components (A) plus (B) plus (C) exhibit acceptable water vapor permeability ranging from equal to slightly less than that of the comparative lacquer. Coatings of Examples 3j and 3l, having more than 10 parts of petroleum wax, exhibit a distinct advantage over the comparative lacquer in resistance to transmission of water vapor.

These compositions are coated on cellophane at a coating weight ranging from 1.5 to 3 pounds per ream coated on both sides and dried at 200° F. for 30 seconds. Results for heat sealing and resistance to moisture vapor transmission are at least equal to the results obtained with the coated glassine.

Coordinates for all these Example 3 compositions fall within the useful area defined by D, E, F, G, H, of the triangular graph although they are outside the preferred area defined by J, K, L, M, N, O. Coordinates for these compositions are designated by the lower case letters "i" through "m."

Comparative compositions

The following compositions are typical formulations defined by coordinates falling outside the useful area defined by D, E, F, G, H of the triangular graph.

|  | U | V | W | X | Y | Z |
|---|---|---|---|---|---|---|
| (A) "Chlorowax" 70 | 45 | 45 | 71 | 79 | 79 | 60 |
| (B) "Elvax" 150 | 40 | 15 | 23 | 15 | 7 | 10 |
| (C) Refined petroleum: | | | | | | |
| Wax 1 | 12 | 37 | 4 | 4 | 12 | 28 |
| Wax 2 | 3 | 3 | 2 | 2 | 2 | 2 |
| Total wax | 15 | 40 | 6 | 6 | 14 | 30 |

These compositions, like those of Example 3, are formulated at 21% non-volatile content. They are coated on glassine as described in Example 3.

The coating from composition U fails by blocking badly.

The coating from composition V exhibits inadequate heat seal and does not block.

The coating from composition W exhibits considerable blocking and relatively poor resistance to transmission of water vapor, but the heat seal is excellent.

The coating from composition X exhibits an improvement over that from composition W in reference to blocking and resistance to transmission of water vapor, these properties being inferior to those of the comparative nitrocellulose lacquer. However, the heat seal is less than that of the W coating and better than that of the comparative lacquer, using sealing temperatures in the range of 225° F. to 270° F. The coating from composition X exhibits inadequate resistance to transmission of water vapor although the heat seal is superior to that of the comparative lacquer.

The coating from composition Y exhibits excellent properties, including water vapor transmission equal to that of the comparative lacquer, but the coating fails to provide an adequate heat seal even at 250° F.

The coating from composition Z exhibits excellent properties versus the comparative lacquer composition, but the coating fails to provide an adequate heat seal even at 270° F., using 10 pounds' pressure.

Coordinates for these comparative compositions, which exhibit one or more deficiencies unacceptable for use as a heat sealing, moistureproofing coating under ordinary application conditions, designated by the upper case letters "U" through "Z" on the triangular graph, are outside the useful range defined by the area D, E, F, G, H.

Ethylene/vinyl acetate copolymer "Elvax" 250 substituted wholly or in part for the "Elvax" 150 in Examples 1, 2, and 3 provide useful compositions which deposit satisfactory heat sealing, moistureproofing coatings on glassine and pouch paper. This substitution made in the comparative compositions U through Z does not adequately remedy the deficiencies of these comparative coatings.

Mixtures of resinous "Chlorowax" 70 and liquid "Chlorowax" 50 in the proportions of up to 25 parts of "Chlorowax" 50 per 100 parts by weight of the mixture substituted for the content of "Chlorowax" 70 in Examples 1 and 2 provide useful coating compositions which deposit coatings having adequate heat sealing and moistureproofing properties.

Replacement of up to 25 parts of the content of "Chlorowax" 70 in the composition of Example 1 with liquid "Chlorowax" 40 likewise provides coating compositions which deposit coatings on glassine and pouch paper which are characterized by satisfactory heat sealing and moistureproofing characteristics.

When the petroleum wax 2 in the Examples 1, 2 and 3 formulations is replaced with petroleum wax 1, i.e., component (C) is solely one species of wax, there is a decrease in slip properties. On the other hand, slip can be enhanced by auxiliary agents, e.g., carnauba wax, or by increasing the relative proportion of the petroleum wax 2 which is characterized by improved slip.

EXAMPLE 4

| First portion: | Parts by weight |
|---|---|
| Refined petroleum wax 1 | 184.8 |
| Refined petroleum wax 2 | 16.1 |
| Epoxidized Oil, "Paraplex" G-62 | 30.6 |
| Second portion | |
| "Chlorowax" 70 | 602.7 |
| Third portion | |
| E/VA copolymer "Elvax" 150 | 200.8 |
| | 1035.0 |

The first portion is charged into a jacketed mixer provided with heating means and melt-blended to a temperature of about 170° F. Then with the mixer running, the second portion is gradually blended into the first portion melt with the temperature being increased to about 270° F. Then then third portion is gradually blended into the melt of the blended prior two portions with the mixer running and the temperature being increased to about 280° F.

When the melt is uniform in composition, it is packaged and cooled to solidify the product.

This composition is applied as a hot-melt to glassine and pouch paper. The resulting coated pellicles are equivalent in quality and performance to these same pellicles coated with the composition of Example 1 at the same coating weight.

The composition of Example 4 is dissolved in toluol at a temperature of about 110° F. in an amount sufficient to provide a non-volatile content in the range of 20% to 37.5% by weight. Glassine and pouch paper are coated with these solution coating compositions and the resulting coated pellicles exhibit the same advantageous properties as shown by the pellicles coated with the Example 1 composition.

When the epoxidized oil, "Paraplex" G–62, present as a heat-stabilizer, is omitted from the melt composition of Example 4, the resulting melt is significantly darker in color. Performance of the unstabilized composition is not significantly altered while it is in the molten state at about 280° F. for 4 hours. Darkening and degradation of the unstabilized composition is more significant at higher temperatures such as 300° F. and 330° F.

EXAMPLE 5

| First portion: | Parts by weight |
| --- | --- |
| Refined petroleum wax 1 | 69.0 |
| Refined petroleum wax 2 | 6.0 |
| Epoxy stabilizer | 2.2 |
| Second portion: | |
| "Chlorowax" 70 | 225.0 |
| Third portion: | |
| "Elvax" 150 | 75.0 |
| | 377.2 |

"Epoxol" 9–5 and "Paraplex" G–60, epoxidized oils, and "Epon" 828 epoxy polyether condensate of epichlorohydrin and bis-phenol are equally useful as the epoxy stabilizer.

The preparation of the hot-melt composition follows the procedure indicated for Example 4. The first portion is melt-blended at about 180° F. The second portion is added incrementally and melt-blended with the first portion as the temperature is increased to 250° F. Then the third portion is melt-blended into the previous two portions, with the temperature being increased to about 330° F.

The resulting compositions in the solidified state are slightly darker than the solidified composition of Example 4. The performance of these compositions as hot-melt coatings to provide heat sealing and moisture-proofing properties to glassine and pouch paper is equivalent to that of the Example 4 composition.

I claim:

1. A coating composition comprising, as the essential organic film-forming components thereof, a ternary combination of (A) a resinous chlorinated paraffin containing at least about 60% chlorine by weight as the principal component, (B) a copolymer of ethylene and vinyl acetate having a content of about 20% to 40% of copolymerized vinyl acetate and 60% to 80% of copolymerized ethylene, and (C) at least one refined petroleum wax, 100 parts by weight of said ternary combination consisting of at least 47 parts of (A) said chlorinated paraffin, at least 12 parts of (B) said ethylene/vinyl acetate copolymer, and at least 8 parts of (C) said refined petroleum wax, and containing at least one mutual solvent for said film-forming components.

2. A coating composition of claim 1 wherein 100 parts of said ternary combination consist of the following proportions:
    (A) said resinous chlorinated paraffin,
        47 to 80 parts,
    (B) said ethylene/vinyl acetate copolymer,
        12 to 33 parts, and
    (C) said refined petroleum wax, 8 to 33 parts.

3. A coating composition of claim 1 wherein 100 parts of said ternary combination consist of the following proportions:
    (A) said resinous chlorinated paraffin,
        50 to 67 parts,
    (B) said ethylene/vinyl acetate copolymer,
        15 to 27 parts, and
    (C) said refined petroleum wax, 13 to 30 parts.

4. A coating composition of claim 1 wherein (A) said chlorinated paraffin is characterized by a chlorine content from about 65% to about 70% by weight.

5. A coating composition of claim 1 wherein (B), said ethylene/vinyl acetate copolymer, is characterized by a content of from about 27% to about 33% copolymerized vinyl acetate and an inherent viscosity in the range of 0.6 to 1.2 based on a 0.25% solution in toluol at 30° C.

6. A coating composition of claim 1 wherein (C) said petroleum wax component is characterized by an AMP melting point in the range from about 130° F. to about 165° F.

7. A coating composition of claim 1 wherein said mutual solvent distills in the range of from about 150° F. to about 300° F. and comprises an aromatic hydrocarbon solvent.

8. A coating composition comprising, as the essential organic film-forming material thereof, 100 parts of a ternary combination consisting of 50 to 67 parts of (A) resinous chlorinated paraffin having a chlorine content of about 70%, and complementally 50 to 33 parts total of (B) an ethylene/vinyl acetate copolymer characterized by a content of about 27% to 33% copolymerized vinyl acetate, and an inherent viscosity of 0.6 to 1.2 based on a 0.25% solution in toluol at 86° F., and (C) at least one refined paraffinic petroleum wax having a melting point in the range of 130° F. to 165° F., the relative proportion of the wax (C) being from 40 to 60 parts per 100 parts by weight of (B) plus (C), said ternary combination being in solution in a mutual solvent, comprising toluol and being characterized by a distillation range of about 150° F. to 300° F., in a proportion sufficient to provide a non-volatile content in the range of about 15% to 45% by weight.

9. A hot-melt coating composition consisting essentially of 47 to 80 parts of (A) a resinous chlorinated paraffin having a chlorine content of at least 60.0%, 12 to 33 parts of (B) an ethylene/vinyl acetate copolymer characterized by a content of 20% to 40% of copolymerized vinyl acetate and an inherent viscosity in the range of 0.5 to 1.5 based on a 0.25% solution in toluol at 86° F., and (C) 8 to 33 parts of at least one refined paraffinic petroleum wax for a total of 100 parts of said essential film-forming components (A), (B) and (C), and an effective small proportion of a thermal stabilizer for the chlorine-containing component.

10. A hot-melt composition of claim 9 wherein said thermal stabilizer is characterizel by the presence of epoxy functionality having an oxirane oxygen atom bridging adjacent carbon atoms in the molecule.

11. As an article of manufacture, a pellicle having on at least one surface thereof a dry coating of the composition of claim 2 at a coating weight in the range of from about 0.75 pound per ream of 3000 square feet coated on one side to about 20 pounds per ream coated on both sides.

12. An article of claim 11 wherein said pellicle is glassine coated on both sides with said dry coating at a coating weight in the range of from about 2 to about 10 pounds per ream.

13. An article of claim 11 wherein said pellicle is paper coated on both sides with said dry coating at a coating weight in the range of from about 1.5 pounds to about 20 pounds per ream.

14. An article of claim 11 wherein said pellicle is cellophane having said dry coating on at least one surface thereof up to a coating weight of about 10 pounds per ream.

15. A method of preparing a coating composition which comprises the steps of dissolving (A) resinous chlorinated paraffin in a liquid organic medium, blending (B) an ethylene/vinyl acetate copolymer into the resulting solution at a temperature in the range from about 95° F. up to the boiling temperature of said liquid organic medium and thereby dissolve said copolymer, blending (C) a refined paraffinic hydrocarbon wax into the resulting solution of said components (A) and (D) at a temperature of at least 95° F., and thereafter cooling the composition to about room temperature, said liquid organic medium comprising at least one mutual solvent for said components (A), (B) and (C) and being characterized by a distillation range of from about 150° F. to about 300° F., and being present in a proportion sufficient to provide the composition with a non-volatile content in the range of about 10% to 60% by weight of the total composition, said non-volatile content consisting essentially of 100 parts by weight of a ternary combination of (A), (B) and (C) in the proportions of 47 to 80 parts of (A) resinous chlorinated paraffin, 12 to 33 parts of (B) ethylene/vinyl acetate copolymer, and 8 to 33 parts of (C) refined paraffinic hydrocarbon wax, the resinous chlorinated paraffin wax (A) being characterized by a chlorine content of from 60% to about 70%, and the copolymer (B) being characterized by a content of 20% to 40% of copolymerized vinyl acetate.

References Cited by the Examiner
UNITED STATES PATENTS

| | | | |
|---|---|---|---|
| 2,669,521 | 2/1954 | Bierly | 260—28.5 |
| 2,877,196 | 3/1959 | Reding | 260—28.5 |
| 2,962,464 | 11/1960 | Feild | 106—15 |
| 3,048,553 | 8/1962 | Moss | 260—28.5 |

References Cited by the Applicant
UNITED STATES PATENTS

| | | |
|---|---|---|
| 2,470,536 | 5/1949 | Thomas. |
| 2,490,550 | 12/1949 | Sermattei. |
| 2,492,760 | 12/1949 | Murphy et al. |

MORRIS LIEBMAN, *Primary Examiner.*

MILTON STERMAN, *Examiner.*

UNITED STATES PATENT OFFICE
CERTIFICATE OF CORRECTION

Patent No. 3,223,662                      December 14, 1965

Albert William Dreger

It is hereby certified that error appears in the above numbered patent requiring correction and that the said Letters Patent should read as corrected below.

Column 1, line 30, for "is" read -- in --; line 63, for "J." read -- J, --; column 12, line 58, for "characterizel" read -- characterized --; column 13, line 13, for "(D)" read -- (B) --.

Signed and sealed this 20th day of September 1966.

(SEAL)
Attest:

ERNEST W. SWIDER                      EDWARD J. BRENNER
Attesting Officer                         Commissioner of Patents